(12) United States Patent
Fodor

(10) Patent No.: US 10,207,748 B2
(45) Date of Patent: Feb. 19, 2019

(54) LONGITUDINAL MEMBER ARRANGEMENT OF A BODY OF A MOTOR VEHICLE AND BODY OF A MOTOR VEHICLE WITH A LONGITUDINAL MEMBER ARRANGEMENT OF THIS TYPE

(71) Applicant: Bayerische Motoren Werke Aktiengesellschaft, Munich (DE)

(72) Inventor: Balazs Fodor, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 15/395,624

(22) Filed: Dec. 30, 2016

(65) Prior Publication Data

US 2017/0106920 A1    Apr. 20, 2017

Related U.S. Application Data

(63) Continuation of application No. PCT/EP2015/063580, filed on Jun. 17, 2015.

(30) Foreign Application Priority Data

Jul. 3, 2014    (DE) .................. 10 2014 212 924

(51) Int. Cl.
*B60N 99/00*    (2006.01)
*B62D 29/04*    (2006.01)
(Continued)

(52) U.S. Cl.
CPC ............. *B62D 29/04* (2013.01); *B62D 21/15* (2013.01); *B62D 21/152* (2013.01);
(Continued)

(58) Field of Classification Search
CPC ..... B62D 29/04; B62D 21/15; B60Y 2306/01
See application file for complete search history.

(56) References Cited

U.S. PATENT DOCUMENTS 6,203,098 B1    3/2001  Motozawa et al.
6,299,246 B1    10/2001  Tomka
(Continued)

FOREIGN PATENT DOCUMENTS

DE    44 23 642 C1    10/1995
DE    199 38 937 A1    3/2000
(Continued)

OTHER PUBLICATIONS

Cover page of EP 0 944 472 A1 published Sep. 29, 1999 (one (1) page).

(Continued)

*Primary Examiner* — Lori L Lyjak
(74) *Attorney, Agent, or Firm* — Crowell & Moring LLP

(57) ABSTRACT

A longitudinal member arrangement of a body of a motor vehicle is designed such that, in the event of a collision of the motor vehicle, the longitudinal member arrangement progressively fails, absorbing collision energy, with a first longitudinal member element which is formed from a fiber composite, and with a second longitudinal member element which is formed from a fiber composite and is arranged behind the first longitudinal member element. The first longitudinal member element and the second longitudinal member element are connected to each other by a connecting element. The longitudinal member arrangement is designed such that, in the event of the collision of the motor vehicle, the second longitudinal member element begins to fail after the first longitudinal member element has failed.

20 Claims, 1 Drawing Sheet

(51) Int. Cl.
 *B62D 21/15* (2006.01)
 *B62D 29/00* (2006.01)
(52) U.S. Cl.
 CPC ......... *B62D 29/005* (2013.01); *B62D 29/041* (2013.01); *B60Y 2306/01* (2013.01)

(56) References Cited

U.S. PATENT DOCUMENTS

| | | |
|---|---|---|
| 6,854,791 B1 | 2/2005 | Jaggi |
| 2004/0201252 A1 | 10/2004 | Bechtold et al. |
| 2011/0316295 A1* | 12/2011 | Yamada ................. B62D 21/11 293/132 |
| 2014/0193192 A1 | 7/2014 | Eipper |

FOREIGN PATENT DOCUMENTS

| | | |
|---|---|---|
| DE | 101 40 503 A1 | 3/2003 |
| DE | 10 2006 026 385 A1 | 12/2007 |
| DE | 10 2010 020 793 A1 | 2/2011 |
| DE | 10 2010 050 874 A1 | 5/2012 |
| DE | 10 2010 052 794 A1 | 5/2012 |
| DE | 10 2011 108 156 A1 | 1/2013 |
| DE | 10 2013 209 971 A1 | 12/2014 |
| EP | 1 316 409 A1 | 6/2003 |
| JP | 2003-170860 A | 6/2003 |
| WO | WO 98/15404 A1 | 4/1998 |
| WO | WO 01/28845 A1 | 4/2001 |

OTHER PUBLICATIONS

International Search Report (PCT/ISA/210) issued in PCT Application No. PCT/EP2015/063580 dated Sep. 2, 2015 with English-language translation (six (6) pages).

German-language Written Opinion (PCT/ISA/237) issued in PCT Application No. PCT/EP2015/063580 dated Sep. 2, 2015 (seven (7) pages).

German Search Report issued in counterpart German Application No. 10 2014 212 924.9 dated Mar. 12, 2015 with partial English-language translation (thirteen (13) pages).

English translation of Chinese Office Action issued in counterpart Chinese Application No. 201580035399.X dated May 29, 2018 (two (2) pages).

* cited by examiner

LONGITUDINAL MEMBER ARRANGEMENT OF A BODY OF A MOTOR VEHICLE AND BODY OF A MOTOR VEHICLE WITH A LONGITUDINAL MEMBER ARRANGEMENT OF THIS TYPE

CROSS REFERENCE TO RELATED APPLICATIONS

This application is a continuation of PCT International Application No. PCT/EP2015/063580, filed Jun. 17, 2015, which claims priority under 35 U.S.C. § 119 from German Patent Application No. 10 2014 212 924.9, filed Jul. 3, 2014, the entire disclosures of which are herein expressly incorporated by reference.

BACKGROUND AND SUMMARY OF THE INVENTION

The present invention relates to a longitudinal member arrangement of a body of a motor vehicle, and to a body of a motor vehicle having a longitudinal member arrangement of this type. The longitudinal member arrangement forms a load-bearing structural element of the body and, in the case of a collision of the motor vehicle, fails progressively with the absorption of collision energy.

It is known to design a motor vehicle, in particular a passenger motor vehicle which has a front part, a passenger cell and a rear part, to be as safe as possible in a collision for a vehicle occupant. Here, a front part and/or a rear part usually have/has structural elements which, in the case of a collision, are deformed progressively over a defined section with a predetermined load profile, and absorb collision energy in the process as the passenger cell with the vehicle occupant is stopped. It is known to use a ductile material, such as steel or aluminum, which is deformed plastically over the predetermined section for a body structure of this type.

Recently, there have been endeavors to use fiber composite materials instead of metallic materials for a body structure of this type of a motor vehicle. In contrast to a metallic body structural member, a body structural member made from fiber composite material does not fail by way of plastic deformation but substantially by way of progressive brittle failure. Failure of this type or a failure mechanism of this type is called, for example, "crushing". In the case of the "crushing" failure mechanism, more or less complete disintegration (called pulverization, fragmentation or else splintering) of the body structural member takes place primarily by way of brittle fracture. A further form of "crushing" is defined folding over of the material by 180° directly at an impact surface, said folding over also being called peeling open or peeling. In the case of "crushing", a fiber fracture mechanism in conjunction with friction takes effect in order to dissipate the kinetic collision energy. The two stated failure mechanisms function effectively in the case of a frontal impact, in the case of which the force on the body structural member lies perpendicularly with respect to a member cross section. Between the abovementioned failure types of "crushing", there are all possible intermediate forms of failure which differ fundamentally by way of a fiber fracture into larger or smaller parts. The smaller the parts in the failure, the higher the ability to absorb collision energy during failure and/or the higher the load, at which the failure takes place.

A further property of a body structural member made from fiber composite material is that a force profile of a force, with which the body structural member is loaded and with which a failure finally occurs, reaches a peak force at the beginning as a result of an initial very small elastic deformation of the body structural member, until the brittle failure starts and is then set over a further failure force profile at a lower force level which is considerably lower than the initial peak force. It is likewise known that the initial peak force can be reduced by way of what is known as a triggering means, that is to say targeted weakening of the body structural member. As soon as the peak force is overcome, the body structural member fails progressively without a further peak force as at the beginning of the brittle failure.

It is the object of the present invention to provide a longitudinal member arrangement of a body of a motor vehicle and to provide a body of a motor vehicle having a longitudinal member arrangement of this type, the longitudinal member arrangement consisting substantially of fiber composite material and separating a failure of sections of the longitudinal member arrangement from one another reliably.

This and other objects are achieved by way of a longitudinal member arrangement of a body of a motor vehicle, and by way of a body of a motor vehicle having such a longitudinal member arrangement, in accordance with embodiments of the invention.

A longitudinal member arrangement of a body of a motor vehicle according to the present invention is configured in such a way that, in the case of a collision, in particular in the case of a frontal collision or a collision load in the longitudinal direction of the longitudinal member arrangement, of the motor vehicle, it fails progressively in a manner which absorbs collision energy. The longitudinal member arrangement has a first longitudinal member element which is configured from a fiber composite material, and has a second longitudinal member element which is configured from a fiber composite material. The second longitudinal member element is arranged behind the first longitudinal member element, and is aligned, in particular, with the first longitudinal member element. The first longitudinal member element and the second longitudinal member element are connected to one another by a connecting element. Here, the longitudinal member arrangement is configured in such a way that, in the case of the collision of the motor vehicle, the second longitudinal member element begins to fail after the first longitudinal member element has failed.

Here, the longitudinal member arrangement fails over a predetermined failure section in a brittle manner, that is to say in accordance with the "crushing" failure mechanism which was described at the outset.

The second longitudinal member element begins to fail, in particular, only after the first longitudinal member element or a predetermined failure section of the first longitudinal member element has failed completely and has therefore exhausted its collision energy absorption potential.

By way of a division of the longitudinal member arrangement into a first longitudinal member element and a second longitudinal member element which represent separate elements, it can be ensured by way of simple means that the second longitudinal member element does not begin to fail prematurely, since an initial failure force level has to be overcome first of all in the case of the second longitudinal member element which is higher than a failure force level of said section of the longitudinal member arrangement if the first longitudinal member element and the second longitudinal member element were an integral, single-piece longitudinal member element of the longitudinal member arrangement. The connecting element provides a separation of the two longitudinal member elements and therefore also makes a complete separation of the failure of the first longitudinal member element possible from the failure of the second longitudinal member element.

According to one preferred development of the longitudinal member arrangement of the present invention, the first longitudinal member element has a triggering structure which reduces an initial failure force level of the first longitudinal member element, with the result that the initial failure force level of the first longitudinal member element is lower than an initial failure force level of the second longitudinal member element.

A triggering structure is a known term which is used for targeted weakening or structural pre-damaging of fiber composite materials, a triggering structure causes the first longitudinal member element to have a lower initial peak force until a start of a failure of the longitudinal member element. A longitudinal member element having a triggering structure has a lower initial failure force level than a longitudinal member element without a triggering structure.

This can prevent the second longitudinal member element from beginning to fail together with, or before, the first longitudinal member element.

At least one connecting region of the first longitudinal member element and one connecting region of the second longitudinal member element preferably have an identical cross-sectional shape, in particular an identical inner and/or outer cross-sectional shape. As an alternative or in addition, the connecting regions can have an identical wall thickness. Furthermore, as an alternative or in addition, the connecting regions can have an identical material or an identical material composition.

As a result, for example, the first longitudinal member element and the second longitudinal member element can be manufactured by, first of all, a single longitudinal member being manufactured. The longitudinal member is thereupon divided into two longitudinal member elements, that is to say into the first longitudinal member element and the second longitudinal member element. In other words, it is therefore possible to manufacture a single longitudinal member, from which the first longitudinal member element and the second longitudinal member element can be manufactured by way of a simple production step, such as cutting or sawing of the longitudinal member. As a result, the manufacturing of the longitudinal member arrangement is simplified. If, in particular, the first longitudinal member element is additionally provided with a triggering structure, it is possible, despite an identical cross-sectional shape, identical wall thickness and/or identical material composition, to ensure that the first longitudinal member element fails before the second longitudinal member element.

According to one development, a predetermined failure section of the first longitudinal member element and a predetermined failure section of the second longitudinal member element have an identical cross-sectional shape, an identical wall thickness and/or an identical material composition.

As a result, for example, the longitudinal member arrangement can be used by way of a continuously manufactured longitudinal member with a constant cross-sectional shape, constant wall thickness and/or constant material composition, in order to separate it into two parts, namely the first longitudinal member element and the second longitudinal member element. In this case, it is necessary that the first longitudinal member element is additionally provided with a triggering structure, with the result that it is ensured that the first longitudinal member element fails before the second longitudinal member element. A longitudinal member which is manufactured in a continuous manufacturing method can be manufactured particularly inexpensively.

According to one preferred development of the longitudinal carrier arrangement of the present invention, the connecting element is configured in such a way that the connecting element is supported on a front end side of the second longitudinal member element. In addition, the rear end side of the first longitudinal member element can be supported on the connecting element.

Here, the front end side of the second longitudinal member element can be supported on a wall which runs in the transverse direction with respect to the longitudinal member arrangement. The rear end side of the first longitudinal member element can likewise be supported on a wall of the connecting element, which wall runs in the transverse direction with respect to the longitudinal direction of the longitudinal member arrangement.

The connecting element preferably has a wall which runs transversely with respect to the longitudinal direction of the longitudinal member arrangement and on the front side of which the rear end side of the first longitudinal member element is supported, and on the rear side of which the front end side of the second longitudinal member element is supported.

As a result of the support of the connecting element or the wall of the connecting element on the second longitudinal member element, a transmission of force in the longitudinal direction of the longitudinal member arrangement to the second longitudinal member element can take place effectively. As a result of the support of the first longitudinal member element on the connecting element, in particular on a wall of the connecting element, a force can advantageously be transmitted in the longitudinal direction from the first longitudinal member element to the connecting element and from the connecting element to the second longitudinal member element.

As an alternative, the connecting element can also be configured without an end wall, it being possible for the first longitudinal member element and/or the second longitudinal member element to be connected to the connecting element via a connection which can be subjected to a shear load, for example via an adhesive bond and/or via a screw or rivet connection.

The connecting element can be configured from a metallic material. As an alternative, the connecting element can also be configured from a fiber composite material. In the case where the connecting element is configured from a metallic material, a steel or aluminum material is preferred.

According to one preferred development, the connecting element has a first sleeve section which encloses or engages around a rear end of the first longitudinal member element. In other words, the rear end of the first longitudinal member element is received in the first sleeve section or is pushed into the latter. As an alternative or in addition, the connecting element has a first projection section which is enclosed or engaged around by the rear end of the first longitudinal member element. In other words, the projection section is pushed into the rear end of the first longitudinal member element or is received by the rear end of the first longitudinal member element.

A connection or configuration of the connecting element in this way makes secure and fixed connection possible between the connecting element and the first longitudinal member element, said connection also being capable of absorbing transverse forces.

According to one preferred development, the connecting element has a second sleeve section which engages around or encloses a rear end of the second longitudinal member element. In other words, the rear end of the second longitudinal member element is received in the second sleeve section and is pushed into the latter. As an alternative or in addition, the connecting element has a second projection section which is enclosed or engaged around by a rear end of the second longitudinal member element. The second projection section is therefore received in the front end of the second longitudinal member element or is pushed into the latter.

As a result, a fixed connection is provided between the connecting element and the second longitudinal member element, which connection can absorb transverse forces.

Overall, the connecting element can therefore make a secure connection possible between the first longitudinal member element and the second longitudinal member element, which connection can also absorb transverse forces.

The first longitudinal member element preferably has a closed cross section and is therefore configured as a hollow girder. As an alternative or in addition, the second longitudinal member element has a closed cross section and is therefore configured as a hollow girder.

Furthermore, the present invention relates to a body of a motor vehicle having a longitudinal member arrangement of this type, the longitudinal member arrangement being provided in a front part or a rear part of the motor vehicle, and a bumper transverse member being fastened indirectly or directly to the longitudinal member arrangement.

The first longitudinal member element and/or the second longitudinal member element preferably consist/consists of a fiber reinforced plastic composite material with carbon fibers. In addition or as an alternative, however, the fiber reinforced plastic composite material can also comprise other fibers, such as glass fibers or aramid fibers. Any fibers which can be used appropriately in body construction are contemplated.

Here, the fibers of the fiber reinforced plastic composite material can preferably be present, in particular, as endless fibers in the fiber reinforced plastic composite material, since endless fibers make a particularly high strength of the fiber reinforced plastic composite material possible.

Developments of the invention which are described in the above text can be combined with one another in any desired manner, if appropriate and possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
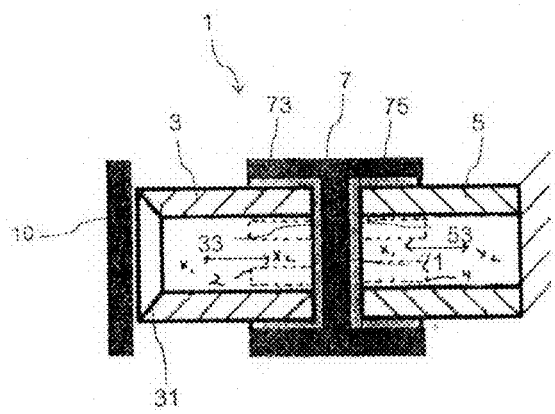
FIG. 1 is a schematic sectioned side view of a longitudinal member arrangement according to one exemplary embodiment of the present invention.
Figure 2:
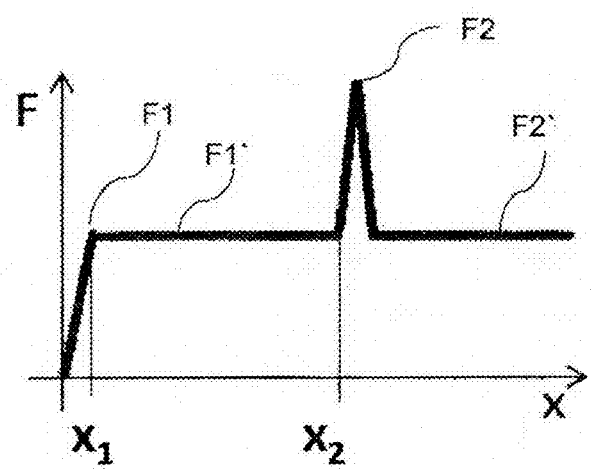
FIG. 2 is a schematic diagram of a force profile F over a failure section x in the case of a failure of the longitudinal member arrangement according to the exemplary embodiment of the present invention as a consequence of a collision.

The following text is a detailed description of one exemplary embodiment of the present invention with reference to FIGS. 1 and 2.

A longitudinal member arrangement 1 according to the exemplary embodiment of the present invention has a first longitudinal member element 3 and a second longitudinal member element 5 which consist of a fiber composite material. The first longitudinal member element 3 and the second longitudinal member element 5 are connected by way of a connecting element 7. A front end side of the first longitudinal member element 3 is provided with a triggering structure in the form of a bevel 31. The first longitudinal member element 3 is received in a first sleeve section 73 of the connecting element 7 (or a first projection section 2 shown in broken lines could be enclosed by the rear end of the first longitudinal member 3). An end side 33 of a rear end of the first longitudinal member element 3 is supported on a wall 71 of the connecting element 7. A front end of the second longitudinal member element 5 is received in a second sleeve section 75 of the connecting element 7 (or again a second projection section 4 shown in broken lines could be enclosed by the front end of the second longitudinal member 5), the wall 71 being supported on a front end side 53 of the second longitudinal member element 5. The connecting element 7 is configured, for example, from a steel material, the rear end of the first longitudinal member element 3 and the front end of the second longitudinal member element 5 being connected to the first sleeve section 73 and the second sleeve section 75 of the connecting element 7.

The longitudinal member arrangement 1 is a constituent part of a body of a passenger motor vehicle and is, in particular, a front longitudinal member or a rear longitudinal member of the body. In the case of a front-engined passenger motor vehicle, the longitudinal member arrangement can be an engine mount. The longitudinal member arrangement can extend substantially over an entire length of a rear part or a front part of the motor vehicle and is a structural constituent part of what is known as a crash structure of the passenger motor vehicle, which crash structure, in the case of a frontal collision or a rear collision of the motor vehicle, fails progressively over a failure section in a manner which absorbs collision energy. Here, the body of the motor vehicle can have a left-hand longitudinal member arrangement and a right-hand longitudinal member arrangement, to which a bumper transverse member 10 is attached indirectly or directly. The longitudinal member arrangement 1 can therefore be a constituent part of a main load path in the case of a frontal collision or a rear collision of the passenger motor vehicle, which main load path extends from a bumper transverse member as far as a passenger cell.

The longitudinal member arrangement 1 according to the exemplary embodiment of the present invention consists of a plastic which is reinforced by carbon fiber, that is to say a carbon fiber composite material.

The first longitudinal member element 3 and the second longitudinal member element 5 are in each case hollow girders with, for example, a rectangular or square cross section. In particular, a failure section of the first longitudinal member element 3 and a failure section of the second longitudinal member element 5 are configured with an identical cross-sectional shape, an identical wall thickness and from an identical material. The first longitudinal member element 3 and the second longitudinal member element 5 (that is to say, at least their failure sections) differ possibly by way of a length and the triggering structure of the first longitudinal member element 3 (which is not present in the second longitudinal member element 5 or is of weaker configuration).

In the case of a frontal collision or a rear collision of the motor vehicle, a load is introduced via the bumper transverse member into the front end of the first longitudinal member element 3 which, as has already been described in the above text, is provided with a triggering structure, with the result that it begins to fail. The first longitudinal member element 3 fails progressively in a brittle manner into small parts by way of the "crushing" failure mechanism, until a failure section from x1 to x2 (see FIG. 2) of the first longitudinal member element 3 is exhausted.

FIG. 2 is a schematic diagram of a force profile F over a failure section x in the case of a failure of the longitudinal member arrangement 1 according to the exemplary embodiment of the present invention as a consequence of a collision. As can be seen from FIG. 2, an initial failure force level F1 of the first longitudinal member element 3 is low or precisely as high, as a result of the triggering structure, as a force level in a further failure profile. The initial failure force level F1 and the further force profile F1' are lower than an initial failure force level F2 of the second longitudinal member element 5. Therefore, the first longitudinal member element 3 initially fails completely over its entire failure section x1 to x2, until the energy absorption potential of the first longitudinal member element 3 is exhausted. Therefore, a load as a result of the collision can rise to the initial failure force level F2 of the second longitudinal member element 5 and leads to the second longitudinal member element 5 also beginning to fail. Since the second longitudinal member element 5 is designed just like the first longitudinal member element 3, the second longitudinal member element 5 fails in a further profile substantially at a force level F2' which corresponds approximately to the force level F1'.

As an alternative to the exemplary embodiment, the initial failure force level F1 of the first longitudinal member element 3 can also be selected to be somewhat greater than the further force level profile F1', as long as the initial failure force level F1 of the first longitudinal member element 3 is sufficiently lower than the initial failure force level F2 of the second longitudinal member element 5. It is likewise possible that the first longitudinal member element 3 and the second longitudinal member element 5 are configured to be different in terms of their cross-sectional shape, wall thickness, and/or material composition, with the result that the force level profiles F1', F2' can also differ from one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinal member arrangement of a body of a motor vehicle, comprising:
    a first longitudinal member element configured from a fiber composite material;
    a second longitudinal member element configured from a fiber composite material; and
    a connecting element configured to connect the first longitudinal member element and the second longitudinal element, wherein
    the second longitudinal member element is arranged behind the first longitudinal member element and is connected to the first longitudinal member element via the connecting element, and
    the longitudinal member arrangement is configured such that, in an event of a collision of the motor vehicle, the second longitudinal member element begins to fail after the first longitudinal member element has failed, whereby a progressive failure occurs that absorbs collision energy.

2. The longitudinal member arrangement according to claim 1, wherein
    the first longitudinal member element has a triggering structure configured to reduce an initial failure force level of the first longitudinal member element,
    whereby the initial failure force level of the first longitudinal member element is lower than the initial failure force level of the second longitudinal member element.

3. The longitudinal member arrangement according to claim 1, wherein
    at least one connecting region of the first longitudinal member element and one connecting region of the second longitudinal member element have one or more of: an identical cross-sectional shape, an identical wall thickness, and an identical material composition.

4. The longitudinal member arrangement according to claim 2, wherein
    at least one connecting region of the first longitudinal member element and one connecting region of the second longitudinal member element have one or more of: an identical cross-sectional shape, an identical wall thickness, and an identical material composition.

5. The longitudinal member arrangement according to claim 3, wherein
    a predetermined failure section of the first longitudinal member element and a predetermined failure section of the second longitudinal member element have one or more of: an identical cross-sectional shape, an identical wall thickness, and an identical material composition.

6. The longitudinal member arrangement according to claim 1, wherein
    the connecting element is configured so as to support a front end side of the second longitudinal member element and to support a rear end side of the first longitudinal member element.

7. The longitudinal member arrangement according to claim 6, wherein one or both of:
    on a front side of a wall of the connecting element, the rear end side of the first longitudinal member element is supported, and
    on a rear side of the wall, the front end side of the second longitudinal member element is supported.

8. The longitudinal member arrangement according to claim 1, wherein
    the connecting element has one or both of:
    a first sleeve section which engages around a rear end of the first longitudinal member clement, and
    a first projection section which is enclosed by the rear end of the first longitudinal member element.

9. The longitudinal member arrangement according to claim 7, wherein
    the connecting element has one or both of:
    a first sleeve section which engages around a rear end of the first longitudinal member element, and
    a first projection section which is enclosed by the rear end of the first longitudinal member element.

10. The longitudinal member arrangement according to claim 8, wherein
    the connecting element has one or both of:
    a second sleeve section which engages around a rear end of the second longitudinal member element, and
    a second projection section which is enclosed by the front end of the second longitudinal member element.

11. The longitudinal member arrangement according to claim 9, wherein
the connecting element has one or both of:
a second sleeve section which engages around a rear end of the second longitudinal member element, and
a second projection section which is enclosed by the front end of the second longitudinal member element.

12. The longitudinal member arrangement according to claim 1, wherein one or both of:
the first longitudinal member element has a closed cross section, and
the second longitudinal member element has a closed cross section.

13. The longitudinal member arrangement according to claim 11, wherein one or both of:
the first longitudinal member element has a closed cross section, and
the second longitudinal member element has a closed cross section.

14. A body of a motor vehicle, comprising:
a front part or a rear part of the motor vehicle, the front part or the rear part of the motor vehicle comprising a longitudinal member arrangement,
wherein the longitudinal member arrangement comprises:
a first longitudinal member element configured from a fiber composite material;
a second longitudinal member element configured from a fiber composite material; and
a connecting element configured to connect the first longitudinal member element and the second longitudinal element, wherein
the second longitudinal member element is arranged behind the first longitudinal member element and is connected to the first longitudinal member element via the connecting element, and
the longitudinal member arrangement is configured such that, in an event of a collision of the motor vehicle, the second longitudinal member element begins to fail after the first longitudinal member element has failed, whereby a progressive failure occurs that absorbs collision energy,
a bumper transverse member fastened to the longitudinal member arrangement.

15. The body of the motor vehicle according to claim 14, wherein
the first longitudinal member element has a triggering structure configured to reduce an initial failure force level of the first longitudinal member element,
whereby the initial failure force level of the first longitudinal member element is lower than the initial failure force level of the second longitudinal member element.

16. The body of the motor vehicle according to claim 15, wherein
at least one connecting region of the first longitudinal member element and one connecting region of the second longitudinal member element have one or both of:
an identical cross-sectional shape, an identical wall thickness, and
an identical material composition.

17. The body of the motor vehicle according to claim 16, wherein
a predetermined failure section of the first longitudinal member element and a predetermined failure section of the second longitudinal member element have one or both of: an identical cross-sectional shape, an identical wall thickness, and an identical material composition.

18. The body of the motor vehicle according to claim 17, wherein
the connecting element is configured so as to support a front end side of the second longitudinal member element and to support a rear end side of the first longitudinal member element.

19. The body of the motor vehicle according to claim 18, wherein one or both of:
on a front side of a wall of the connecting element, the rear end side of the first longitudinal member element is supported, and
on a rear side of the wall, the front end side of the second longitudinal member element is supported.

20. The body of the motor vehicle according to claim 19, wherein
the connecting element has one or both of:
a first sleeve section which engages around a rear end of the first longitudinal member element, and
a first projection section which is enclosed by the rear end of the first longitudinal member element.

* * * * *